United States Patent
Wang et al.

(10) Patent No.: US 9,692,551 B2
(45) Date of Patent: Jun. 27, 2017

(54) CHANNEL QUALITY INDICATOR ADJUSTMENT TO ACCOUNT FOR NETWORK-ASSISTED INTERFERENCE CANCELLATION

(71) Applicant: Telefonaktiebolaget L M Ericsson (publ), Stockholm (SE)

(72) Inventors: Yi-Pin Eric Wang, Fremont, CA (US); Sairamesh Nammi, Kista (SE); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/910,460

(22) PCT Filed: Jul. 10, 2014

(86) PCT No.: PCT/SE2014/050884
§ 371 (c)(1),
(2) Date: Feb. 5, 2016

(87) PCT Pub. No.: WO2015/020594
PCT Pub. Date: Feb. 12, 2015

(65) Prior Publication Data
US 2016/0182183 A1 Jun. 23, 2016

Related U.S. Application Data

(60) Provisional application No. 61/863,501, filed on Aug. 8, 2013.

(51) Int. Cl.
*H04W 24/00* (2009.01)
*H04L 1/00* (2006.01)
(Continued)

(52) U.S. Cl.
CPC ......... *H04L 1/0001* (2013.01); *H04B 17/336* (2015.01); *H04B 17/345* (2015.01); *H04L 1/20* (2013.01)

(58) Field of Classification Search
CPC ..... H04W 24/00; H04W 24/08; H04W 28/04; H04L 1/0026
(Continued)

(56) References Cited

U.S. PATENT DOCUMENTS

2009/0131066 A1* 5/2009 Barve ................... H04L 1/0026
455/452.2
2010/0190447 A1* 7/2010 Agrawal ............. H04W 72/082
455/63.1
(Continued)

FOREIGN PATENT DOCUMENTS

WO 2009096843 A1 8/2009
WO 2011103476 A1 8/2011
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.6.0, Jun. 2013, 1-209.
(Continued)

*Primary Examiner* — Danh Le
(74) *Attorney, Agent, or Firm* — Murphy, Bilak & Homiller, PLLC (57) ABSTRACT

Techniques for adjusting channel quality reports to reflect interference cancellation at a mobile terminal are disclosed. An example embodiment is a method, in a node of a wireless network, for adjusting channel quality reports received from a mobile terminal to account for interference cancellation
(Continued)

performed by the mobile terminal. According to this example method, a channel quality report for a serving cell is received from the mobile terminal. Further, one or more mobility measurement reports for the serving cell and at least one interfering cell are received from the mobile terminal. The channel quality report is then adjusted, based on the one or more mobility measurement reports. The resulting adjusted channel quality report may be used for any of several purposes, including, for example, to scheduling for the mobile terminal and adapting of modulation and coding schemes for the mobile terminal.

26 Claims, 3 Drawing Sheets (51) Int. Cl.
*H04L 1/20* (2006.01)
*H04B 17/336* (2015.01)
*H04B 17/345* (2015.01)

(58) Field of Classification Search
USPC .................. 455/452.2, 423, 67.13; 370/329
See application file for complete search history.

(56) References Cited

U.S. PATENT DOCUMENTS

| | | | | |
|---|---|---|---|---|
| 2011/0149914 A1* | 6/2011 | Tidestav | ............... | H04B 7/0434 370/335 |
| 2012/0282864 A1* | 11/2012 | Dimou | .................. | H04W 36/22 455/67.14 |
| 2013/0102309 A1* | 4/2013 | Chande | ............... | H04W 52/244 455/435.1 |
| 2013/0170362 A1* | 7/2013 | Futaki | ................... | H04W 24/02 370/241.1 |
| 2013/0237245 A1* | 9/2013 | Tinnakornsrisuphap | | H04W 64/00 455/456.1 |

FOREIGN PATENT DOCUMENTS

| | | |
|---|---|---|
| WO | 2013061828 A1 | 5/2013 |
| WO | 2013133747 A2 | 9/2013 |
| WO | 2013133751 A3 | 11/2013 |
| WO | 2014004897 A1 | 1/2014 |
| WO | 2014076636 A1 | 5/2014 |

OTHER PUBLICATIONS

Unknown, Author, "[DRAFT] Receiver performance and enhanced CELL_FACH state", LG Electronics, 3GPP TSG-WG2 Meeting #58, R2-072173, Kobe, Japan, May 7-11, 2007, 1.
Unknown, Author, "Heterogeneous Network Deployment Scenarios", Ericsson, ST-Ericsson, 3GPP TSG-RAN WG1 #70bis, R1-124513, San Diego, CA, USA, Oct. 8-12, 2012, 1-3.
Unknown, Author, "Initial considerations on Heterogeneous Networks for UMTS", Ericsson, ST-Ericsson, 3GPP TSG RAN WG1 Meeting #70bis, R1-124512, San Diego, CA, USA, Oct. 8-12, 2012, pp. 1-7.
Unknown, Author, "Proposed SID: Study on UMTS Heterogeneous Networks", Huawei, HiSilicon, TSG RAN Meeting #57, RP-121436, Chicago, USA, Sep. 4-7, 2012, 1-5.

\* cited by examiner

CHANNEL QUALITY INDICATOR ADJUSTMENT TO ACCOUNT FOR NETWORK-ASSISTED INTERFERENCE CANCELLATION

TECHNICAL FIELD

The technology disclosed herein is generally directed to wireless communications and is more particularly related to techniques for handling channel quality feedback in wireless networks that support network-assisted interference cancellation.

BACKGROUND

In a typical cellular radio system, wireless terminals (also referred to as user equipment unit nodes, UEs, mobile terminals, and/or mobile stations) communicate via a radio access network (RAN) with one or more core networks, which provide access to data networks, such as the Internet, and/or the public-switched telecommunications network (PSTN). The RAN covers a geographical area that is divided into cell areas, with each cell area being served by a radio base station (also referred to as a base station, a RAN node, a "NodeB", and/or enhanced NodeB "eNodeB"). A cell area is a geographical area where radio coverage is provided by the base station equipment at a base station site. The base stations communicate through radio communication channels with wireless terminals that are in range of the base stations.

Cellular communications system operators have begun offering mobile broadband data services based on, for example, Wideband Code Division Multiple Access (WCDMA), High Speed Packet Access (HSPA), and Long Term Evolution (LTE) wireless technologies. Moreover, fueled by introduction of new devices designed for data applications, end user performance requirements are steadily increasing. The increased adoption of mobile broadband has resulted in significant growth in traffic handled by high-speed wireless data networks. Accordingly, techniques that allow cellular operators to manage networks more efficiently are desired.

Techniques to improve downlink (base station-to-wireless terminal) performance may include multiple-input, multiple-output (MIMO) techniques such as 4-branch MIMO, multi-flow communication, multi-carrier deployment, etc. Since spectral efficiencies on a per-link basis may be approaching theoretical limits, some next steps for improving downlink performance will be focused on improving spectral efficiencies per unit area. Further efficiencies for wireless networks may be achieved, for example, by changing a topology of traditional networks to provide increased uniformity of user experiences throughout a cell. Currently, so-called heterogeneous networks are being developed by members of the $3^{rd}$-Generation Partnership Project (3GPP) as discussed, for example, in: RP-121436, Study on UMTS Heterogeneous Networks, TSG RAN Meeting #57, Chicago, USA, 4-7 Sep. 2012; R1-124512, Initial considerations on Heterogeneous Networks for UMTS, Ericsson, ST-Ericsson, 3GOO TSG RAN WG1 Meeting #70 bis, San Diego, Calif., USA, 8-12 Oct. 2012; and R1-124513, Heterogeneous Network Deployment Scenarios, Ericsson, ST-Ericsson, 3GPP TSG-RAN WG1 #70 bis, San Diego, Calif., USA, 8-12 Oct. 2012.

A traditional cellular network, which may be referred to as a "homogeneous network," is a network of base stations (also referred to as NodeB's, enhanced NodeB's, or eNBs) in a planned layout, providing communications services for a collection of user terminals (also referred to as user equipment nodes, UEs, and/or wireless terminals). In a homogeneous network, all or most of the base stations in a given region may have similar transmit power levels, antenna patterns, receiver noise floors, and/or backhaul connectivity to the data network. Moreover, all or most of the base stations in a homogeneous network may offer unrestricted access to user terminals in the network, and each base station may be capable of serving roughly the same number of user terminals. Current cellular wireless communications systems in this category may include, for example, Global System for Mobile communication (GSM) networks, WCDMA networks, networks that support High-Speed Downlink Packet Access (HSDPA), LTE networks, Worldwide Interoperability for Microwave Access (Wi-MAX) networks, etc.

In a heterogeneous network, low-power base stations (also referred to as low-power nodes, LPNs, micro nodes, pico nodes, femto nodes, relay nodes, remote radio units or "RRU" nodes, small cells, etc.) may be deployed along with or as an overlay to planned and/or regularly placed macro base stations. A macro base station (MBS) may thus provide service over a relatively large macro cell area and each low-power node (LPN) may provide service for a respective relatively small LPN cell coverage area that falls all or partly within a relatively large macro cell coverage area. The radio power transmitted by an LPN (e.g., 2 Watts) may be relatively small compared to the power transmitted by a macro base station (e.g., 40 Watts for a typical macro base station). An LPN may be deployed, for example, to reduce/eliminate a coverage hole(s) in the coverage provided by the macro base stations, and/or to off-load traffic from macro base stations (e.g., to increase capacity in a high traffic location, also referred to as a hot-spot). Due to the lower transmit power and smaller physical size, an LPN may offer greater flexibility for site acquisition.

Figure 1:
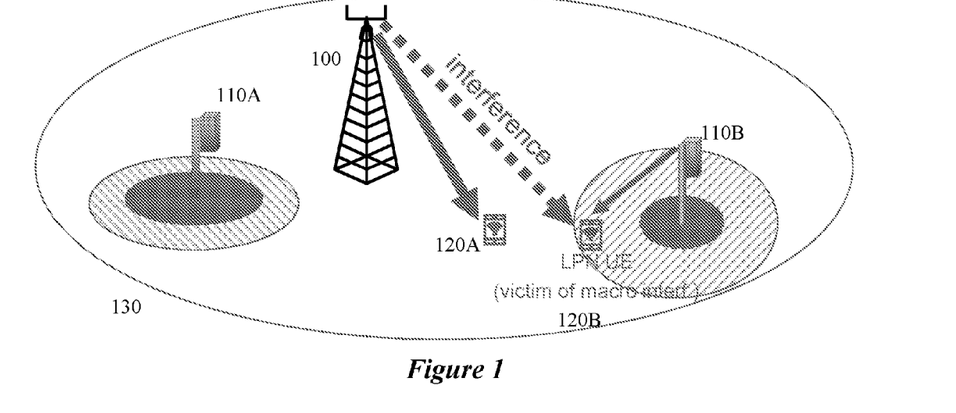
FIG. 1 illustrates an inter-cell interference scenario in a heterogeneous network deployment

Inter-cell interference generally presents a big performance issue for cell edge users. In a heterogeneous network (HetNet), the impact of inter-cell interference can be much higher, due to large differences between the transmit power levels of macro base stations and LPNs. This is illustrated in FIG. 1, which illustrates inter-cell interference between a macro base station 100 and an LPN 110B, at a wireless terminal 120B. The interference arises because of a transmission from the macro base station 100 to wireless terminal 120A, which may occur at the same time as transmissions from LPN 110B to wireless terminal 120B.

In the illustrated scenario, the coverage areas of the LPNs 110A and 110B fall entirely within a coverage area 130 of the macro base station. The stripe-covered regions in FIG. 1 cover a region between an outer circle and an inner circle around each of the LPNs 110A and 110B. The inner circle represents an area where the received power from each LPN 110 is higher than the received power from the macro base station 100. The outer circle represents an area where the path loss to the LPN base station 110 is smaller than that to the macro base station 100.

The stripe-covered area between the inner and outer circles is often referred to as the imbalance zone. This imbalance zone could potentially be an LPN range-expansion area because, from the uplink (terminal-to-base-station) perspective, the system would prefer that the terminal still be served by the LPN within this area. However, from the downlink (base-station-to-terminal) perspective, terminals at the outer edge of such an imbalance zone experience a very large received-power difference between the macro and LPN layers. For example, if the transmit power levels are 40 watts and 1 watt for the macro node and LPN, respectively, this power difference can be as high as 16 dB. As a result of these power differences, if a terminal in the range-expansion zone is served by a LPN cell and the macro cell is serving another terminal at the same time, using the same radio resources, then the terminal served by the LPN is subject to very severe interference from the macro base station.

In LTE, a technique known as "inter-cell interference coordination" (ICIC) is supported, via the eNodeB-to-eNodeB X2 interface. Each cell can signal to its neighboring cells, identifying high-power resource blocks in the frequency or time domains. This allows the neighboring cells to schedule cell-edge users in such a way as to avoid these high-power resource blocks. Such a mechanism can be used to reduce the impact of inter-cell interference. However, even when ICIC is supported, some inter-cell interference remains. The terminal that is interfered with is often called a "victim" terminal.

The impact of inter-cell interference, whether or not it is partly mitigated by ICIC, can depend on the victim terminal's ability to mitigate interference, which may in turn depend on the sophistication of the terminal's receiver and/or the availability of information about the interfering signal, for use in interference suppression or cancellation. For example, a victim terminal may attempt to first decode the interference signal and then cancel the interference signal from the received signal before decoding its desired signal. In many cases, even relatively strong interference signals can thus be rendered harmless, provided that they can be decoded correctly and removed at a victim terminal.

An additional technique known as "network-assisted interference cancellation" (NA-IC) is being considered in 3GPP for both LTE and HSPA networks. The concept is to have the network send assistance information to the wireless terminal (referred to as a "UE" in 3GPP documentation) to enable the terminal to perform interference cancellation. In particular, the wireless terminal needs information to allow it to decode signals that are targeted to other devices.

The scenario in FIG. 1 is one in which NA-IC could be beneficial. As shown, an LPN-served UE 120B in the range expansion area (stripe-covered area) of LNP 110B experiences strong experience from the macro base station 100. In such a scenario, if the network provides certain information about the interference signal to the victim UE 120B, then the victim UE 120B may be able to cancel the interfering macro signal and boost its achievable data rate in the LPN downlink. This assistance information may include, for example, the UE ID for the UE 120A that is the actual target of the interfering signal, the modulation format of the interfering signal, the transport block size, etc.

SUMMARY

One problem that arises in the context of network-assisted interference is how to manage the reporting and handling of channel-quality indicators (CQIs). The network may know that a scheduled UE is capable of interference cancellation (IC), and may provide assistance information to facilitate interference cancellation operation at the UE. However, the CQI feedback from the UE may not reflect the possibility of cancelling interference and thus may not account for a reduced interference level after interference cancellation. In this case, the CQI feedback will underestimate the data rate that is actually achievable by the UE when given appropriate assistance information.

Several of the embodiments detailed herein address this problem, using techniques for adjusting CQI to reflecting interference cancellation at the UE. Note that while the term CQI can refer to the particular reports provided by UEs in a WCDMA or LTE network, the term should be more broadly understood here to apply to any signal quality feedback that can be used by a network scheduler to perform scheduling, adapt modulation and coding schemes, etc.

An example embodiment of the techniques and systems disclosed herein is a method, in a node of a wireless network, for adjusting channel quality reports received from a mobile terminal to account for interference cancellation performed by the mobile terminal. According to this example method, a channel quality report for a serving cell is received from the mobile terminal. Further, one or more mobility measurement reports for the serving cell and at least one interfering cell are received from the mobile terminal. The channel quality report is then adjusted, based on the one or more mobility measurement reports. The resulting adjusted channel quality report may be used for any of several purposes, including, for example, to scheduling for the mobile terminal and adapting of modulation and coding schemes for the mobile terminal.

In some embodiments, the one or more mobility measurement reports are indicative of a received power of the desired signal and a received power for an interfering signal. In some of these embodiments, adjusting the channel quality report is based on an estimate of a ratio between the received power of the interfering signal and the received power of the desired signal.

In various embodiments, the channel quality report indicates a signal-to-interference-plus-noise ratio, SINR, for a desired signal at the mobile terminal. The one or more mobility measurement reports may include an indication of a received code signal power (RCSP) or an indication of an energy-per-chip-to-interference ratio (Echo) or both, for either or both of the desired signal and an interfering signal.

In some embodiments, the channel quality report is adjusted to account for a reduction in interfering signal power by the interference cancellation at the mobile terminal. This adjustment may be based on an estimate of the efficiency of the interference cancellation performed by the mobile terminal, for example.

In some particular embodiments, the adjusting of the channel quality report is based on an estimate of a ratio of the powers at the mobile terminal between an interfering signal and a desired signal and wherein said ratio of the powers is calculated according to $$\frac{P_{Macro}}{P_{LPN}} \approx \frac{RSCP(Macro)}{RSCP(LPN)}, \text{ or}$$

$$\frac{P_{Macro}}{P_{LPN}} \approx \frac{Ec(macro)/Io}{Ec(LPN)/Io}, \text{ or}$$

$$\frac{P_{Macro}}{P_{LPN}} \approx \frac{CQI(\text{macro to } UE)}{CQI(LPN \text{ to } UE)},$$

where $$\frac{P_{Macro}}{P_{LPN}}$$

is the estimated ratio of powers, RSCP(Macro) and RSCP (LPN) are received signal code power, RSCP, measurements for the interfering and desired signals respectively, Ec(macro)/Io and Ec(LPN)/Io are energy-per-chip-over-interference measurements for the interfering and desired signals, respectively, and CQI(macro to UE) and CQI(LPN to UE) are reported channel-quality-indicators for the interfering and desired signals, respectively.

In some of these and in some other particular embodiments, the channel quality report is adjusted according to the expression $$(SINR_{IC}(LPN))^{-1} = (SINR(LPN))^{-1} - \frac{\rho P_{Macro}}{\gamma P_{LPN}},$$

where SINR(LPN) is a signal-to-interference-plus-noise ratio (SINR) corresponding to the received channel quality report, $SINR_{IC}(LPN)$ is an SINR corresponding to the adjusted channel quality report, $$\frac{P_{Macro}}{P_{LPN}}$$

is a ratio of powers at the mobile terminal between an interfering signal $P_{Macro}$ and a desired signal $P_{LPN}$, $\rho$ is an estimate of an efficiency of the interference cancellation, and $\gamma$ is a power allocation factor for a traffic channel code. In some of these embodiments, $\rho$ is a static, pre-defined estimate of the efficiency of the interference cancellation. In others, $\rho$ is estimated, based on an estimated SINR for the interfering signal. The SINR for the interfering signal may be estimated, for example, according to $$CQI(int) \approx \frac{RSCP(Macro)}{RSCP(LPN)}\beta, \text{ or}$$

$$CQI(int) \approx \frac{Ec(macro)/Io}{Ec(LPN)/Io}\beta,$$

where CQI(int) is the estimated SINR for the interfering signal, RSCP(Macro) and RSCP(LPN) are RSCP measurements for the interfering and desired signals respectively, Ec(macro)/Io and Ec(LPN)/Io are energy-per-chip-over-interference measurements for the interfering and desired signals, respectively, and $\beta$ is a scaling factor. In some embodiments, $\beta$ is adjusted from time to time to account for changes in fading.

Apparatus embodiments of the presently disclosed techniques include wireless network nodes adapted to adjust channel quality reports received from a mobile terminal according to one or more of the above-summarized methods, to account for interference cancellation performed by the mobile terminal. An example wireless network node includes communications interface circuitry adapted for communication with one or more other wireless network nodes or adapted for communication with mobile terminals via corresponding radio links, or both, a processing circuit adapted to control the communications interface circuitry and to: receive a channel quality report from the mobile terminal, via the communications interface circuitry; receive one or more mobility measurement reports from the mobile terminal, via the communications interface circuitry; and adjust the channel quality report, based on the one or more mobility measurement reports. The several variations of the methods summarized above and detailed herein are also applicable to these corresponding wireless network nodes.

Using the techniques described herein, a wireless network node (e.g., a radio network controller or a base station) can determine the suitable transport block size for a UE that is the victim of inter-cell interference, while properly accounting for the benefit of inter-cell interference cancellation. This can be used to maximize the benefit of network-assisted interference cancellation. The concept is applicable to both HSDPA and LTE networks. Those skilled in the art will appreciate further features and advantages of the presently disclosed systems and methods upon reviewing the accompanying drawings and the detailed description that follows.

DETAILED DESCRIPTION

Inventive concepts will now be described more fully hereinafter with reference to the accompanying drawings, in which example embodiments of the presently disclosed systems and methods are disclosed. The inventive techniques disclosed herein may, however, be embodied in many different forms and should not be construed as limited to the embodiments set forth herein. Rather, these embodiments are provided so that this disclosure will be thorough and complete, and fully convey the scope of the presently disclosed techniques to those readers knowledgeable in the field of wireless communications. It should also be noted that these embodiments are not mutually exclusive. Components from one embodiment may be tacitly assumed to be present or used in another embodiment.

For purposes of illustration and explanation only, the presently disclosed techniques are described herein in the context of operating in a Radio Access Network (RAN) that communicates over radio communication channels with wireless terminals, which may also be referred to herein as mobile terminals or UEs. As those terms are used herein, a mobile terminal, wireless terminal, or UE can include any device that receives data from a communication network, and may include, but are not limited to, a mobile telephone ("cellular" telephone), laptop/portable computer, pocket computer, hand-held computer, desktop computer, a machine-to-machine (M2M) or machine-type-communication (MTC) type device, a sensor with a wireless communication interface, etc.

In some embodiments of a RAN, several base stations may be connected, e.g., by landlines or radio channels, to a radio network controller (RNC). An RNC, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without separate RNC(s) between them, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers that make up the UMTS radio access network. Thus, UTRAN is essentially a radio access network using wideband code division multiple access (WCDMA) for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from LTE and or UMTS is used in this disclosure to exemplify embodiments of the inventive concepts, this should not be seen as limiting the scope of inventive concepts to only these systems. Other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Furthermore, although the description below focuses, for purposes of illustration, on example embodiments in which described solutions are applied in heterogeneous networks that include a mix of relatively higher-power (e.g., "macro") base stations and relatively lower-power node (e.g., "pico") base stations, the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks keeps up increasing with this ever-increasing user demand. The latest systems such as Long Term Evolution (LTE), especially when coupled with interference mitigation techniques, have spectral efficiencies very close to theoretical Shannon limit. Continuous upgrades of current networks to support the latest technologies and increases in the number of base stations per unit area are two of the most widely used approaches to meet the increasing traffic demands.

One upgrade approach that is gaining high attention involves the deployment of so-called heterogeneous networks, where the traditional pre-planned macro base stations (known as the macro layer) are complemented with several low-powered base stations, which may be deployed in a relatively unplanned manner. The 3rd Generation Partnership Project (3GPP) has incorporated this concept of heterogeneous networks as one of the core items of study in the latest enhancements of LTE, such as LTE release 11, and several low-powered base stations to realize heterogeneous networks such as pico base stations, femto base stations (also known as home base stations or HeNBs), relays, and RRHs (remote radio heads) have been defined. Similar concepts are being applied to upgrade UMTS networks, as well.

Figure 2:
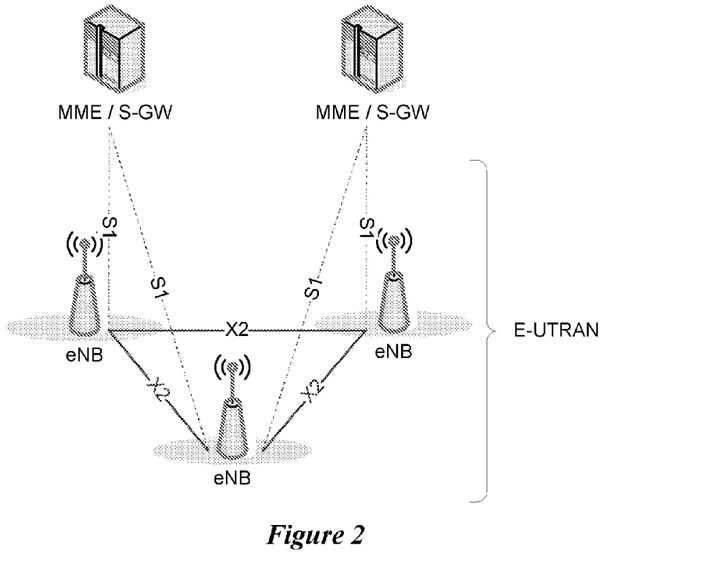
FIG. 2 is a schematic/block diagram illustrating the overall E-UTRAN architecture.

The Evolved UMTS Terrestrial Radio Access Network (E-UTRAN) includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the Mobility Management Entity (MME) by means of the S1-MME interface and to the Serving Gateway (S-GW) by means of the S1-U interface. The S1 interface supports many-to-many relation between MMEs/S-GWs and eNBs. The E-UTRAN architecture is illustrated in FIG. 2.

The eNB hosts functionalities such as Radio Resource Management (RRM), radio bearer control, admission control, header compression of user plane data towards serving gateway, and/or routing of user plane data towards the serving gateway. The MME is the control node that processes the signaling between the UE and the CN (core network). Significant functions of the MME are related to connection management and bearer management, which are handled via Non Access Stratum (NAS) protocols. The S-GW is the anchor point for UE mobility, and also includes other functionalities such as temporary DL (down link) data buffering while the UE is being paged, packet routing and forwarding to the right eNB, and/or gathering of information for charging and lawful interception. The PDN Gateway (P-GW) is the node responsible for UE IP address allocation, as well as Quality of Service (QoS) enforcement (as further discussed below). The reader is referred to 3GPP TS 36.300 and the references therein for further details of functionalities of the different nodes.

Heterogeneous Networks

Figure 3:
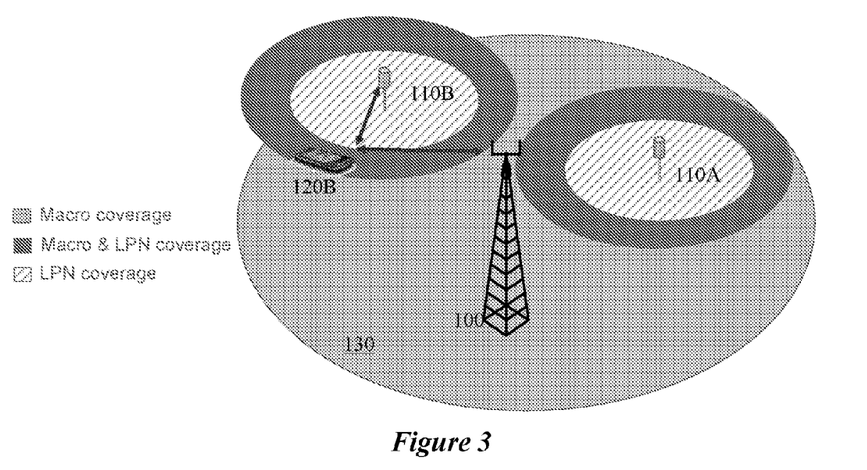
FIG. 3 is a schematic diagram illustrating a heterogeneous deployment with a higher-power macro node and lower-power pico nodes according to some embodiments.

A heterogeneous deployment or heterogeneous network, as illustrated in FIG. 3, includes network transmission nodes (e.g., micro and pico nodes or base stations) operating with different transmit powers and with overlapping coverage areas. A heterogeneous deployment/network is considered as an interesting deployment strategy for cellular networks. In such a deployment, the low-power nodes ("pico nodes") are typically assumed to offer high data rates (Mbit/s) and/or to provide increased/high capacity (users/$m^2$ or Mbit/s/$m^2$) in the local areas where increased data rates/capacity is/are needed/desired, while the high-power nodes ("macro nodes") are assumed to provide full-area coverage. In practice, the macro nodes may correspond to currently deployed macro cells while the pico nodes are later deployed nodes, provided to extend capacity and/or achievable data rates within the macro-cell coverage area where needed/desired. FIG. 3 illustrates a heterogeneous deployment with a higher-power macro node 100 and two lower-power pico nodes, or "low-power nodes" (LPNs) 110A and 110B, the latter of which is serving a UE 120B. In a typical case, there may be multiple LPNs within the coverage area of a macro node.

As discussed above, network-assisted interference cancellation (NA-IC) is being considered in 3GPP for both LTE and HSPA, and may be particularly useful in heterogeneous network deployments. Briefly, the concept is to have the network send assistance information to a victim of interference, to enable the UE to perform interference cancellation and boost its achievable data rate. This assistance information may include, for example, the UE ID for the UE that is the actual target of the interfering signal, the modulation format of the interfering signal, the transport block size, etc.

One problem that arises in the context of network-assisted interference is how to manage the reporting and handling of channel-quality indicators (CQIs). The network may know that a scheduled UE is capable of interference cancellation (IC), and may provide assistance information to facilitate interference cancellation operation at the UE. However, the CQI feedback from the UE may not reflect the possibility that the UE can cancel interference, and thus may not account for a reduced interference level after interference cancellation. In this case, the CQI feedback will cause the network node to underestimate the data rate that is actually achievable by the UE when given appropriate assistance information.

Several of the embodiments detailed herein address this problem, using techniques for adjusting CQI to reflecting interference cancellation at the UE. Note that while the term CQI can refer to the particular reports provided by UEs in a UMTS or LTE network, the term should be more broadly understood here to apply to any signal quality feedback that can be used by a network scheduler to perform scheduling, adapt modulation and coding schemes, etc.

Once again, consider that the CQI feedback from a UE may not reflect the possibility of cancelling interference and thus may not account for a reduced interference level after interference cancellation. In this case, the network needs to adjust the CQI report from the UE, using information available to the network (e.g., at a Radio Network Controller and/or at one or more base stations) to take full advantage of interference cancellation performed at the UE. According to several embodiments of the techniques and apparatus detailed herein, mobility measurements are used for determining the adjusted CQI accounting for interference cancellation at the UE. This allows the network to take full advantage of the IC operation at the UE. Furthermore, methods are detailed below for adjusting CQI feedback from the mobile based on either the mobility measurements or additional CQI feedback from the UE about the interfering link (e.g., the link from the macro base station 100 to the LPN-served UE 120B in FIG. 1).

Using these techniques, the network, whether acting through an RNC, a base station, or some other wireless network node, can better determine a suitable data rate, modulation and coding scheme, and/or transport block size for the victim UE, to account for the benefit of inter-cell interference cancellation. This maximizes the benefit of NA-IC. The techniques and apparatus are applicable to at least HSDPA and LTE networks, and may also be adapted for use with other wireless networks.

According to several of these techniques, mobility measurement reports from the UE are used as a basis for determining an adjusted CQI to account for interference cancellation at the victim UE. According to existing UMTS mobility procedures, a UE measures serving and neighbor cell signal strength based on received signal code power (RSCP) or Ec/Io (energy per chip over interference). Thus, mobility measurements about the macro cell and LPN cell are available at the network.

In the HSPA system, CQI is essentially a quantized representation of signal-to-interference-plus-noise ratio (SINR). The SINR may have a wide range, but CQI has only 31 values. In the discussion below, CQI and SINR may be used interchangeably.

The SINR for the link between LPN to the victim UE can be expressed as $$SINR(LPN) = \frac{\gamma P_{LPN}}{\alpha_{LPN} P_{LPN} + P_{Macro} + N},$$

where $P_{LPN}$ and $P_{Macro}$ are the received power levels from the LPN and macro base station (BS), respectively, N is the power from other cells plus thermal noise, $\alpha_{LPN}$ is the so-called orthogonality factor accounting for the fact that some own-cell interference is reduced due to the use of orthogonal variable spreading factor (OVSF) codes, and $\gamma$ represents the power allocation factor for one HS-PDSCH code.

With inter-cell interference, the interference from the macro BS may be reduced by $\rho P_{Macro}$, where the coefficient $\rho$ is often referred to as the cancellation efficiency. Thus, the SINR after IC can be expressed as:

$$SINR_{IC}(LPN) = \frac{\gamma P_{LPN}}{(\alpha_{LPN} P_{LPN} + P_{Macro} + N) - \rho P_{Macro}}.$$

Thus, the relationship between SINR(LPN) and $SINR_{IC}$(LPN) is $$(SINR_{IC}(LPN))^{-1} = (SINR(LPN))^{-1} - \frac{\rho P_{Macro}}{\gamma P_{LPN}}. \quad (1)$$

Note that in the above equation, $\gamma$ and SINR(LPN) are already known to the network, since the UE reports SINR (LPN) to the serving cell (e.g., an LPN) through CQI feedback, and the CQI estimation at the UE is based on a reference value of $\gamma$ that both the network and UE have established. Thus, the only unknowns are the cancellation efficiency $\rho$ and the received power ratio between the macro received signal and LPN received signal. This power ratio $$\frac{P_{Macro}}{P_{LPN}}$$

can be estimated using mobility measurement reports from the UE:

$$\frac{P_{Macro}}{P_{LPN}} \approx \frac{RSCP(Macro)}{RSCP(LPN)},$$

or, alternatively, $$\frac{P_{Macro}}{P_{LPN}} \approx \frac{Ec(macro)/Io}{Ec(LPN)/Io}.$$

Note that if the UE also feeds back the CQI of the interference link (e.g., from the macro base station to the victim UE in FIG. 1), the power ratio $$\frac{P_{Macro}}{P_{LPN}}$$

can be approximated by:

$$\frac{P_{Macro}}{P_{LPN}} \approx \frac{CQI(\text{macro to } UE)}{CQI(LPN \text{ to } UE)}.$$

In this equation, it is assumed that the CQI values are expressed in linear scale, although the conventional CQI report is sent in log scale.

In some embodiments, the network can assume an arbitrary (fixed) cancellation efficiency value ρ in Equation (1), for obtaining the adjusted SINR. Alternatively, a more accurate estimate of the cancellation efficiency may be used. It is known that the cancellation efficiency is determined by the link quality versus the transport format used in the interfering signal. Thus, if the quality of the interference link, the modulation, and the coding rate of the interfering signal are known, then an accurate estimate of cancellation efficiency may be determined. A precompiled look-up table may be used to determine the cancellation efficiency as a function of link SINR and transport format.

Note that the network generally knows the modulation and coding rate of the interfering signal. Thus, the remaining unknown is the CQI indicative of the quality (SINR) of the interfering link. Accordingly, in some embodiments of the present techniques, the UE is asked to feed back the CQI measurement for the interference link. Alternatively, the CQI of the interference link may be approximated by the mobility measurement reports from the UE, e.g., according to one of the following expressions:

$$CQI(\text{macro to } UE) \approx \frac{RSCP(Macro)}{RSCP(LPN)} \beta$$

or, alternatively, $$CQI(\text{macro to } UE) \approx \frac{Ec(macro)/Io}{Ec(LPN)/Io} \beta$$

Note that mobility measurement reports do not capture fading. While not strictly necessary, the CQI should preferably capture the effects of fading. The factor β in the above equation is introduced to adjust for fading, and may be controlled by an outer control loop. For example, if the network realizes that it is likely that it overestimates the cancellation efficiency, it will reduce the value of β. On the other hand, if the network realizes that it is likely that it underestimates the cancellation efficiency, then it will increase the value of β.

Now, the cancellation efficiency can be obtained by a table look-up operation:

ρ=f(CQI(macro to UE), transport format), where f(*) is implemented by a look-up table. The look-up table can be compiled based on simulations in the design stage, for example, using typical UE interference-cancellation algorithm assumptions and characteristics.

Figure 4:
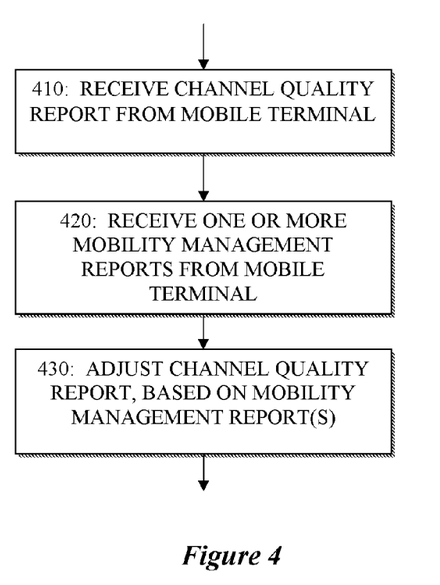
FIG. 4 is a process flow diagram illustrating an example method according to some of the disclosed techniques.

With the above techniques in mind, it will be appreciated that the process flow diagram of FIG. 4 illustrates a generalized method, as implemented in a node of a wireless network, for adjusting channel quality reports received from a mobile terminal to account for interference cancellation performed by the mobile terminal. Note that the node of interest may be a base station, in some embodiments, or some other node in the wireless network, such as a Radio Network Controller (RNC).

As shown at block 410, the illustrated method begins with receiving a channel quality report for a serving cell from a mobile terminal of interest. The channel quality report indicates a signal-to-interference-plus-noise ratio (SINR) for a desired signal at the mobile terminal, in some embodiments, although it may be formatted, quantized, or encoded in any number of different ways. In some cases, as was discussed above, this desired signal may be a signal targeted to the mobile terminal from a base station having a relatively low power, compared to an interfering signal from another base station having a higher power.

As shown at block 420, the method further includes receiving one or more mobility measurement reports for the serving cell and at least one interfering cell from the mobile terminal. In some embodiments, the one or more mobility measurement reports include an indication of a received code signal power (RCSP) or an indication of an energy-per-chip-to-interference ratio (Ec/Io), or both, for either or both of the desired signal and an interfering signal. Other indications of the link conditions for the link between the target base station and the mobile terminal and/or the link between the interfering base station and the mobile terminal are possible. Note that while this step is shown in FIG. 4 as following the receipt of the channel quality report, this is not necessarily the case—any of the mobility measurement reports may be received before, after, or simultaneously with the channel quality indicator. For the subsequent adjustment of the channel quality report to be accurate, of course, the mobility management reports should be generally contemporaneous with the channel quality indicator, so that the channel conditions can be assumed to have remained relatively unchanged over the observation period.

Finally, as shown at block 430, the channel quality report is adjusted, based on the one or more mobility measurement reports. As described in detail above, adjusting the channel quality report comprises adjusting the channel quality report to account for a reduction in interfering signal power by the interference cancellation at the mobile terminal, in several embodiments.

In some embodiments, the adjusting of the channel quality report is further based on an estimate of the efficiency of the interference cancellation, and/or is further based on an estimate of a ratio of powers at the mobile terminal between an interfering signal and a desired signal. Examples of both of these approaches were detailed above. In some of these embodiments, the ratio of powers is estimated from the mobility measurement reports, e.g., by calculating the estimate of the ratio of powers according to:

$$\frac{P_{Macro}}{P_{LPN}} \approx \frac{RSCP(\text{Macro})}{RSCP(LPN)},$$

or $$\frac{P_{Macro}}{P_{LPN}} \approx \frac{Ec(\text{macro})/Io}{Ec(LPN)/Io},$$

or $$\frac{P_{Macro}}{P_{LPN}} \approx \frac{CQI(\text{macro})/Io}{CQI(LPN \text{ to } UE)},$$

where $$\frac{P_{Macro}}{P_{LPN}}$$

is the estimated ratio of powers, RSCP(Macro) and RSCP (LPN) are received signal code power (RSCP) measurements for the interfering and desired signals respectively, Ec(macro)/Io and Ec(LPN)/Io are energy-per-chip-over-interference measurements for the interfering and desired signals, respectively, and CQI(macro to UE) and CQI(LPN to UE) are reported channel-quality-indicators for the interfering and desired signals, respectively.

In some embodiments, the adjusting of the channel quality report illustrated in block 430 is performed according to the expression $$(\text{SINR}_{IC}(LPN))^{-1} = (\text{SINR}(LPN))^{-1} - \frac{\rho P_{Macro}}{\gamma P_{LPN}},$$

where SINR(LPN) is a signal-to-interference-plus-noise ratio (SINR) corresponding to the received channel quality report, $\text{SINR}_{IC}(LPN)$ is an SINR corresponding to the adjusted channel quality report, $$\frac{P_{Macro}}{P_{LPN}}$$

is a ratio of powers at the mobile terminal between an interfering signal $P_{Macro}$ and a desired signal $P_{LPN}$, $\rho$ is an estimate of an efficiency of the interference cancellation, and $\gamma$ is a power allocation factor for a traffic channel code. In some of these embodiments, $\rho$ is a static, pre-defined estimate of the efficiency of the interference cancellation. In others, $\rho$ is estimated, based on an estimated signal-to-interference-plus-noise-ratio (SINR) for the interfering signal. The SINR may be estimated, for example, according to $$CQI(int) \approx \frac{RSCP(\text{Macro})}{RSCP(LPN)} \beta,$$

or $$CQI(int) \approx \frac{Ec(\text{macro})/Io}{Ec(LPN)/Io} \beta,$$

where CQI(int) is the estimated SINR for the interfering signal, RSCP(Macro) and RSCP(LPN) are received signal code power (RSCP) measurements for the interfering and desired signals respectively, Ec(macro)/Io and Ec(LPN)/Io are energy-per-chip-over-interference measurements for the interfering and desired signals, respectively, and $\beta$ is a scaling factor. In some embodiments, $\beta$ is adjusted from time to time, to account for changes in fading.

Hardware Implementations

Figure 5:
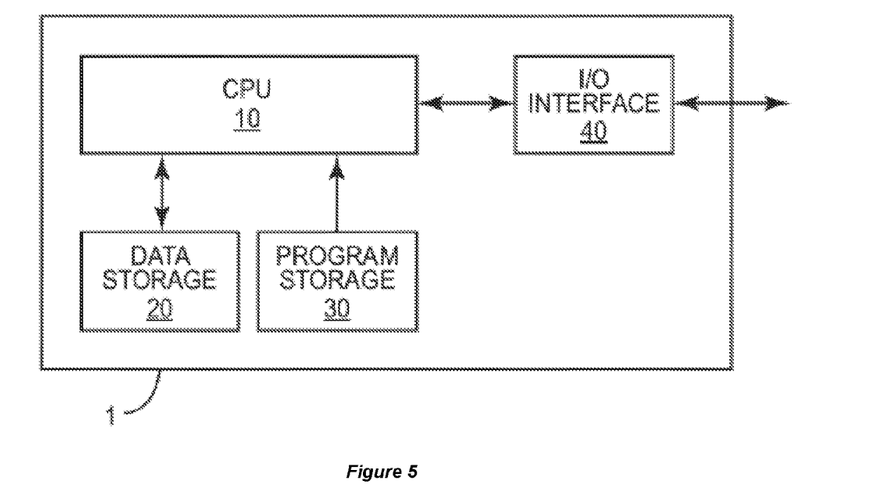
FIG. 5 is a block diagram illustrating elements of an example wireless network node, according to some embodiments.

Several of the techniques and methods described above may be implemented using communications interface circuitry (including radio transceiver circuitry, in the case of a base station) and electronic data processing circuitry provided in a network node, such as an eNodeB, an RNC, or other node in a 3GPP network. FIG. 5 is a schematic illustration of a node 1 in which a method embodying any of the presently described network-based techniques can be implemented. In this example embodiment, a computer program for controlling the node 1 to carry out a method embodying the present invention is stored in a program storage 30, which comprises one or several memory devices. Data used during the performance of a method embodying the present invention is stored in a data storage 20, which also comprises one or more memory devices, one or more of which may be the same as those used for program storage 30. During performance of a method embodying the present invention, program steps are fetched from the program storage 30 and executed by a Central Processing Unit (CPU) 10, which retrieves data as required from the data storage 20. Output information resulting from performance of a method embodying the present invention can be stored back in the data storage 20, or sent to an Input/Output (I/O) interface 40, which is communications interface circuitry that includes a network communications interface circuit for sending and receiving data to and from other network nodes and which may also include a radio transceiver for communicating with one or more terminals.

More particularly, it will be appreciated that the wireless network node 1 of FIG. 5 includes communications interface circuitry adapted for communication with one or more other wireless network nodes or adapted for communication with mobile terminals via corresponding radio links, or both, and a processing circuit made up of CPU 10, data storage 20, and program storage 30. In some embodiments, the processing circuitry is adapted to control the communications interface circuitry and to: receive a channel quality report for a serving cell from the mobile terminal, via the communications interface circuitry; receive one or more mobility measurement reports for the serving cell and at least one interfering cell from the mobile terminal, via the communications interface circuitry; and adjust the channel quality report, based on the one or more mobility measurement reports.

Accordingly, in various embodiments of the invention, a processing circuit, such as the CPU 10 and memory circuits 20 and 30 in FIG. 5, are configured to carry out one or more of the techniques described in detail above. Likewise, other embodiments may include base stations or radio network controllers that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 6:
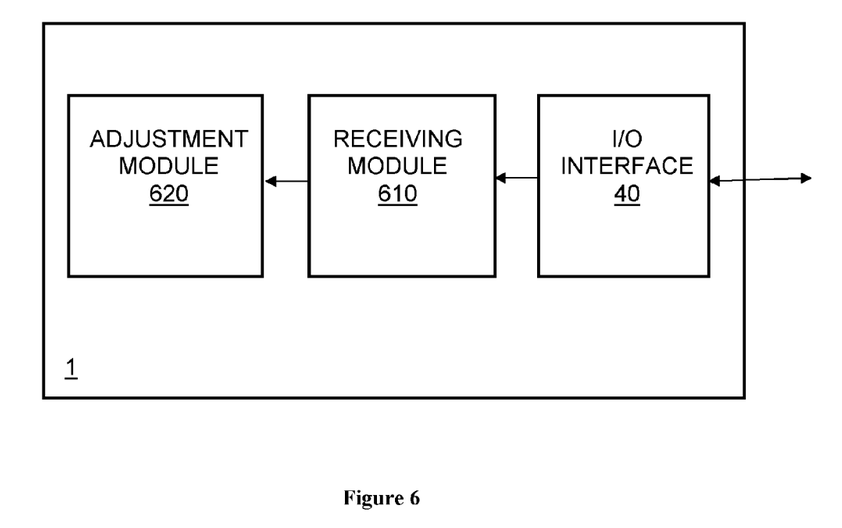
FIG. 6 is another block diagram illustrating elements of an example wireless network node.

FIG. 6 provides a different view of the example network node 1, which in this case is represented with functional modules, including a receiving module 610 and an adjustment module 620. All or part of either or both of these modules may be implemented using a programmed processing circuit like that illustrated in FIG. 5, for example, alone or in combination with other hardware/circuitry. Thus, in some embodiments, network node 1 comprises communications interface circuitry 40, which is adapted for communication with one or more other wireless network nodes or adapted for communication with mobile terminals via corresponding radio links, or both, and a receiving module 610 adapted to receive a channel quality report for a serving cell and one or more mobility measurement reports for the serving cell and at least one interfering cell, from the mobile terminal, via the communications interface circuitry 40. The network node 1 further comprises an adjustment module 620, which is adapted to adjust the channel quality report, based on the one or more mobility measurement reports. The several variations described above with respect to the method of FIG. 4 and the apparatus of FIG. 5 are similarly applicable to the network node 1 as illustrated in FIG. 6.

It will be appreciated by the person of skill in the art that various modifications may be made to the above described embodiments without departing from the scope of the present invention. For example, although embodiments of the present invention have been described with examples that include a communication system compliant to the 3GPP specifications for UMTS and/or LTE, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a node of a wireless network, for adjusting channel quality reports received from a mobile terminal to account for interference cancellation performed by the mobile terminal, the method comprising:
   receiving a channel quality report for a serving cell from the mobile terminal;
   receiving one or more mobility measurement reports for the serving cell and at least one interfering cell from the mobile terminal, wherein the one or more mobility measurement reports are indicative of a received power of the desired signal and a received power for an interfering signal; and
   adjusting the channel quality report, based on the one or more mobility measurement reports.

2. The method of claim 1, wherein adjusting the channel quality report is based on an estimate of a ratio between the received power of the interfering signal and the received power of the desired signal.

3. The method of claim 1, wherein the channel quality report indicates a signal-to-interference-plus-noise ratio (SINR) for a desired signal at the mobile terminal.

4. The method of claim 1, wherein the one or more mobility measurement reports include an indication of a received code signal power (RCSP) or an indication of an energy-per-chip-to-interference ratio (Echo) or both, for either or both of the desired signal and an interfering signal.

5. The method of claim 1, wherein adjusting the channel quality report comprises adjusting the channel quality report to account for a reduction in interfering signal power by the interference cancellation at the mobile terminal.

6. The method of claim 1, wherein adjusting the channel quality report is further based on an estimate of the efficiency of the interference cancellation performed by the mobile terminal.

7. The method of claim 1, wherein adjusting the channel quality report is based on an estimate of a ratio of the powers at the mobile terminal between an interfering signal and a desired signal and wherein said ratio of the powers is calculated according to $$\frac{P_{Macro}}{P_{LPN}} \approx \frac{RSCP(\text{Macro})}{RSCP(\text{LPN})},$$

or $$\frac{P_{Macro}}{P_{LPN}} \approx \frac{Ec(\text{macro})/Io}{Ec(\text{LPN})/Io},$$

or $$\frac{P_{Macro}}{P_{LPN}} \approx \frac{CQI(\text{macro})/Io}{CQI(\text{LPN to UE})},$$

where $$\frac{P_{Macro}}{P_{LPN}}$$

is the estimated ratio of powers, RSCP(Macro) and RSCP(LPN) are received signal code power (RSCP) measurements for the interfering and desired signals respectively, Ec(macro)/Io and Ec(LPN)/Io are energy-per-chip-over-interference measurements for the interfering and desired signals, respectively, and CQI(macro to UE) and CQI(LPN to UE) are reported channel-quality-indicators for the interfering and desired signals, respectively.

8. The method of claim 1, wherein said adjusting the channel quality report comprises adjusting the channel quality report according to the expression $$(\text{SINR}_{IC}(LPN))^{-1} = (\text{SINR}(LPN))^{-1} - \frac{\rho P_{Macro}}{\gamma P_{LPN}},$$

where SINR(LPN) is a signal-to-interference-plus-noise ratio (SINR) corresponding to the received channel quality report, $\text{SINR}_{IC}(LPN)$ is an SINR corresponding to the adjusted channel quality report, $$\frac{P_{Macro}}{P_{LPN}}$$

is a ratio of powers at the mobile terminal between an interfering signal $P_{Macro}$ and a desired signal $P_{LPN}$, $\rho$ is an estimate of an efficiency of the interference cancellation, and $\gamma$ is a power allocation factor for a traffic channel code.

9. The method of claim 8, wherein $\rho$ is a static, predefined estimate of the efficiency of the interference cancellation.

10. The method of claim 8, further comprising estimating $\rho$ based on an estimated signal-to-interference-plus-noise-ratio (SINR) for the interfering signal.

11. The method of claim 10, further comprising estimating the SINR for the interfering signal according to $$CQI(int) \approx \frac{RSCP(\text{Macro})}{RSCP(\text{LPN})} \beta,$$

or $$CQI(int) \approx \frac{Ec(\text{macro})/Io}{Ec(\text{LPN})/Io} \beta,$$

where CQI(int) is the estimated SINR for the interfering signal, RSCP(Macro) and RSCP(LPN) are received signal code power (RSCP) measurements for the interfering and desired signals respectively, Ec(macro)/Io and Ec(LPN)/Io are energy-per-chip-over-interference measurements for the interfering and desired signals, respectively, and $\beta$ is a scaling factor.

12. The method of claim 11, further comprising adjusting $\beta$ from time to time to account for changes in fading.

13. The method of claim 1, further comprising using the adjusted channel quality report to perform at least one of scheduling for the mobile terminal and adapting of modulation and coding schemes for the mobile terminal.

14. A wireless network node adapted to adjust channel quality reports received from a mobile terminal to account for interference cancellation performed by the mobile terminal, the wireless network node comprising:
   communications interface circuitry adapted for communication with one or more other wireless network nodes or adapted for communication with mobile terminals via corresponding radio links, or both; and
   a processing circuit adapted to control the communications interface circuitry and to:

receive a channel quality report for a serving cell from the mobile terminal, via the communications interface circuitry;

receive one or more mobility measurement reports for the serving cell and at least one interfering cell from the mobile terminal, via the communications interface circuitry, wherein the one or more mobility measurement reports are indicative of a received power of the desired signal and a received power for an interfering signal; and adjust the channel quality report, based on the one or more mobility measurement reports.

15. The wireless network node of claim 14, wherein the processing circuit is adapted to adjust the channel quality report based on an estimate of a ratio between the received power of the interfering signal and the received power of the desired signal.

16. The wireless network node of claim 14, wherein the channel quality report indicates a signal-to-interference-plus-noise ratio (SINR) for a desired signal at the mobile terminal.

17. The wireless network node of claim 14, wherein the one or more mobility measurement reports include an indication of a received code signal power (RCSP) or an indication of an energy-per-chip-to-interference ratio (Echo) or both, for either or both of the desired signal and an interfering signal.

18. The wireless network node of claim 14, wherein the processing circuit is adapted to adjust the channel quality report by adjusting the channel quality report to account for a reduction in interfering signal power by the interference cancellation at the mobile terminal.

19. The wireless network node of claim 14, wherein the processing circuit is adapted to adjust the channel quality report based further on an estimate of the efficiency of the interference cancellation.

20. The wireless network node of claim 19, wherein the processing circuit is adapted to adjust the channel quality report based on an estimate of a ratio of the powers at the mobile terminal between an interfering signal and a desired signal, and to calculate the estimate of the ratio of powers according to $$\frac{P_{Macro}}{P_{LPN}} \approx \frac{RSCP(\text{Macro})}{RSCP(LPN)},$$

or $$\frac{P_{Macro}}{P_{LPN}} \approx \frac{Ec(\text{macro})/Io}{Ec(LPN)/Io},$$

or $$\frac{P_{Macro}}{P_{LPN}} \approx \frac{CQI(\text{macro})/Io}{CQI(LPN \text{ to } UE)},$$

where $$\frac{P_{Macro}}{P_{LPN}}$$

is the estimated ratio of powers, RSCP(Macro) and RSCP(LPN) are received signal code power (RSCP) measurements for the interfering and desired signals respectively, Ec(macro)/Io and Ec(LPN)/Io are energy-per-chip-over-interference measurements for the interfering and desired signals, respectively, and CQI(macro to UE) and CQI(LPN to UE) are reported channel-quality-indicators for the interfering and desired signals, respectively.

21. The wireless network node of claim 14, wherein the processing circuit is adapted to adjust the channel quality report according to the expression $$(SINR_{IC}(LPN))^{-1} = (SINR(LPN))^{-1} - \frac{\rho P_{Macro}}{\gamma P_{LPN}},$$

where SINR(LPN) is a signal-to-interference-plus-noise ratio (SINR) corresponding to the received channel quality report, $SINR_{IC}(LPN)$ is an SINR corresponding to the adjusted channel quality report, $$\frac{P_{Macro}}{P_{LPN}}$$

is a ratio of powers at the mobile terminal between an interfering signal $P_{Macro}$ and a desired signal $P_{LPN}$, $\rho$ is an estimate of an efficiency of the interference cancellation, and $\gamma$ is a power allocation factor for a traffic channel code.

22. The wireless network node of claim 19, wherein $\rho$ is a static, pre-defined estimate of the efficiency of the interference cancellation.

23. The wireless network node of claim 19, wherein the processing circuit is further adapted to estimate $\rho$ based on an estimated signal-to-interference-plus-noise-ratio (SINR) for the interfering signal.

24. The wireless network node of claim 23, wherein the processing circuit is further adapted to estimate the SINR for the interfering signal according to $$CQI(int) \approx \frac{RSCP(\text{Macro})}{RSCP(LPN)} \beta,$$

or $$CQI(int) \approx \frac{Ec(\text{macro})/Io}{Ec(LPN)/Io} \beta,$$

where CQI(int) is the estimated SINR for the interfering signal, RSCP(Macro) and RSCP(LPN) are received signal code power (RSCP) measurements for the interfering and desired signals respectively, Ec(macro)/Io and Ec(LPN)/Io are energy-per-chip-over-interference measurements for the interfering and desired signals, respectively, and $\beta$ is a scaling factor.

25. The wireless network node of claim 24, wherein the processing circuit is further adapted to adjust $\beta$ from time to time to account for changes in fading.

26. The wireless network node of claim 14, wherein the processing circuit is further adapted to use the adjusted channel quality report to perform at least one of scheduling for the mobile terminal and adapting of modulation and coding schemes for the mobile terminal.

* * * * *